Nov. 11, 1930.  S. HUNT  1,781,233
MANUFACTURE OF BLOWN GLASS ARTICLES
Filed Sept. 3, 1927
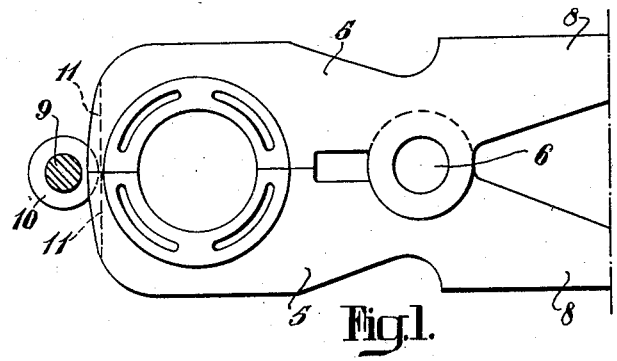
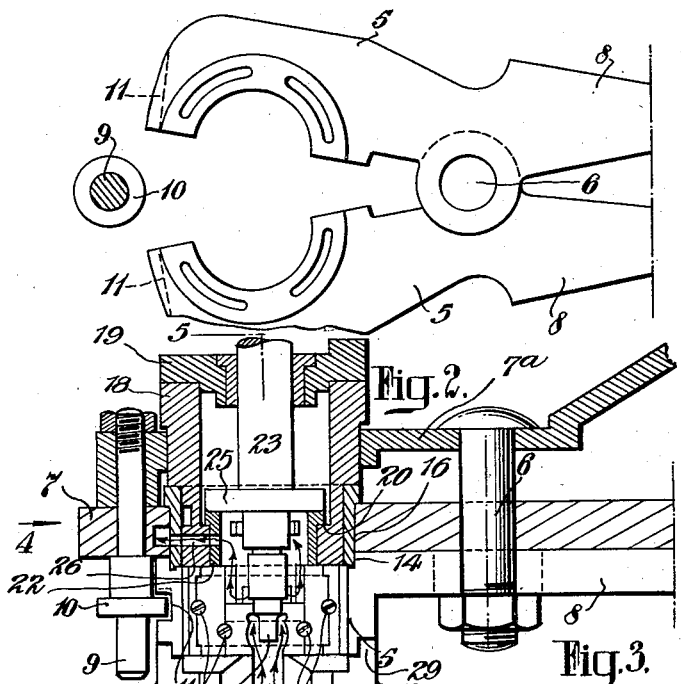
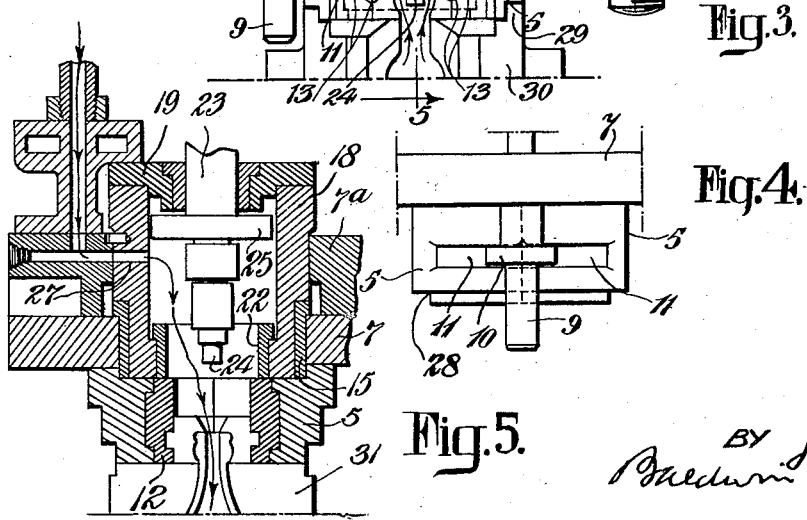
INVENTOR
SYDNEY HUNT,
BY
His ATTORNEYS Patented Nov. 11, 1930

1,781,233

UNITED STATES PATENT OFFICE

SYDNEY HUNT, OF BIRMINGHAM, ENGLAND, ASSIGNOR TO JOHN WALKER & SONS LIMITED, OF LONDON, ENGLAND, A BRITISH COMPANY

MANUFACTURE OF BLOWN-GLASS ARTICLES

Application filed September 3, 1927, Serial No. 217,444, and in Great Britain June 22, 1927.

This invention relates to machines for the manufacture of glass articles, of the type in which a blowing head is provided co-operating with a divided neck mould, and the object of the invention is to so construct a machine that the possibility of the parts of the neck mould being blown or forced away from the under surface of the blowing head, thus causing loss of blowing pressure, is obviated.

According to the general principle of the invention, means are provided in connection with the sections of the divided neck mould and in connection with the blowing head or with some fixed portion of the framework, adapted to co-operate when the neck mould is closed and to resist the tendency for the parts of the neck mould to move away from the blowing head.

The means for effecting this object may include projections or grooves on the divided parts of the neck mould engaging grooves or projections in connection with the blowing head or other relatively fixed portions of the apparatus, such projections and grooves being preferably so arranged that they come into engagement as the parts of the neck mould are closed and out of engagement when they are opened. Moreover, the parts may be so formed that as the closing is effected the clearance between them is progressively decreased, or, if found desirable, eliminated.

In order that the invention may be better understood, it will now be described with reference to the accompanying drawings in which:—

Figs. 1 and 2 shew somewhat diagrammatic plans of a two part ring mould in the closed and open positions.

Fig. 3 is a sectional side elevation shewing one-half of the ring mould, a parison mould and other associated parts, Fig. 4 a detail front elevation taken in the direction of the arrow 4, Fig. 3, and Figure 5 is a vertical sectional view taken on the line 5—5 of Figure 3 and showing a finishing mould in place of the parison mould shown in Figure 3.

In the particular method of carrying out the invention, illustrated, the halves 5 of the neck mould are pivotally mounted at 6 in connection with the blowing head, a portion 7 only of which is shewn, and are furnished with tails or extensions 8 adapted to be operated in the usual manner for opening and closing the halves of the neck mould. Depending from the front of the blowing head is a dowel pin 9 adapted to act as a centralizing pin for the halves of the blow mould (not shewn) in an ordinary manner. At an intermediate position this dowel pin 9 is formed with a flange 10 which projects towards the ring mould and forms a projection with which horizontal grooves or ledges 11 in the halves 5 of the neck or ring mould co-operate.

As will be seen from Fig. 4, the grooves or ledges 11 are so shaped that the clearance between the upper projecting portion thereof and the upper surface of the flange 10 progressively decreases towards the closing position of the mould.

As stated above, the purpose of the flange 10 and grooves 11 is to prevent the neck mould from being forced away from the blowing head when the blowing operation takes place. The manner in which this purpose is accomplished will be made clear by reference to Figures 3 and 5, in which the parts carried by the blow head and arranged to cooperate with the neck mould during the blowing operation are shown.

The neck mould halves are each provided with a removable lining 12 secured in the respective neck mould halves by means of screws 13. The mould halves are conjointly formed with a counter bore 14 which, when the mould halves are closed, embraces the depending lower end portion of a bushing 15 positioned in an opening 16 in the blow head portion 7, the bushing 15 being provided with a flange 17 which is seated upon the blow head portion 7.

Mounted in the upper blow head portion 7ª and in the bushing 16 is a cylindrical casing 18 which is closed at its upper end by a head 19. Adjacent its lower end, the inner wall of the casing is formed with an annular shoulder 20 which serves as a seat for a flange 21 on a liner 22 which fits within the face at the bottom of the casing. The lower end of the liner is flush with the lower end of the casing, and with the lower end of the bushing 15.

A vertically reciprocable plunger 23 extends through the head 19 in axial alignment with the liner 22 and with the neck mould halves, and is provided at its lower end with a stopper 24. The plunger is provided with a circular valve 25 which is movable with the plunger for controlling suction through a suction port 26 and for also controlling the introduction of blowing air through a passage 27 communicating with the interior of the casing 18. See Figure 5.

The bottoms of the neck mould halves 5—5 are conjointly formed with an annular seat 28 which is adapted to receive an upwardly extending flange 29 on a parison mould 30, as shown in Figure 3.

Figure 5 shows the relative positions of the various parts during a blowing operation, the parison mould having been moved away from the neck mould, and a finishing mould 31 moved into position under the neck mould.

When the various parts are in the positions shown in Figure 3, the flange 10 on the pin 9 will be engaged by the upper walls of the grooves 11 in the blow head halves 5, and the mould halves will be firmly held against the bottom of the casing 18 and the liner 22. The valve 25 will be seated on the top of the liner 22, thus closing communication between the neck mould and the interior of the casing 18, and suction will take place through the passage 26 as indicated by the arrows.

After the parison mould has been moved away from the neck mould, and the finishing mould moved into position as shown in Figure 5, the valve 25 will be located at the top of the casing 18 and blowing air will be admitted through the passage 27 to the interior of the casing and to the neck and finishing moulds, as shown by the arrows. The tendency of the blowing air to move the neck mould downwardly will be firmly resisted by the flange 10 which is in contact with the upper sides of the grooves 11.

The invention is not limited to the precise forms or details of construction described, as these may be varied to suit particular classes of machines.

Having now particularly described and ascertained the nature of my said invention and in what manner the same is to be performed, I declare that what I claim is:—

1. In a machine for the manufacture of blown glass articles having a blowing head and a sectional neck mould, the halves of which are pivoted so that they can be opened and closed together; a construction in which the blowing head is furnished with a depending dowel pin located diametrically opposite the pivotal axis of the halves of the mould, and in which the halves of the sectional mould are provided in the neighbourhood of their joint when closed together with means for engaging corresponding means on the dowel pin for the purposes set forth.

2. In a machine for the manufacture of blown glass articles having a blowing head and a sectional neck mould, the halves of which are mounted in pivoted carriers so that they can be opened and closed together; a construction in which the blowing head is furnished with a depending dowel pin located diametrically opposite the pivotal axis of the carriers, and in which the halves of the carrier are provided in the neighbourhood of their joint when closed together with means for engaging corresponding means on the dowel pin for the purposes set forth.

3. In a machine for the manufacture of blown glass articles having a blowing head and a sectional neck mould, the halves of which are mounted in pivoted carriers so that they can be opened and closed together; a construction in which the blowing head is furnished with a depending dowel pin located diametrically opposite the pivotal axis of the carriers, said dowel pin being furnished with a projecting flange, and in which the halves of the carrier are provided in the neighbourhood of their joint when closed, with grooves adapted to engage the aforesaid flange on the dowel pin for the purposes set forth.

4. In a machine for the manufacture of blown glass articles having a blowing head and a sectional neck mould, the halves of which are mounted in pivoted carriers so that they can be opened and closed together; a construction in which the blowing head is furnished with a depending dowel pin located diametrically opposite the pivotal axis of the carriers and in the neighbourhood of the meeting edges of such carriers, when they are closed together, and in which the carriers are provided in the neighbourhood of such meeting edges with means adapted in the closed position of the carriers to engage corresponding means on the dowel pin, the co-operating means on the carriers and the dowel pin being moreover so formed as to wedge the carriers against the underside of the head for the purposes set forth.

5. In a machine for the manufacture of blown glass articles having a blowing head and a sectional neck mould, the halves of which are mounted in pivoted carriers so that they can be opened and closed together; a construction in which the blowing head is furnished with a depending dowel pin located diametrically opposite the pivotal axis of the carriers and in the neighbourhood of the meeting edges of such carriers, when they are closed together, the said dowel pin being provided with a projection the upper surface of which is at right angles to the axis of the said pin, and in which the carriers are provided in the neighbourhood of their meeting edges with means adapted in the closed position of the carriers to engage over the before mentioned projecting surface on the dowel pin, for the purposes set forth.

6. In a machine for the manufacture of blown glass articles having a blowing head and a sectional neck mould, the halves of which are mounted in pivoted carriers so that they can be opened and closed together; a construction in which the blowing head is furnished with a depending dowel pin located diametrically opposite the pivotal axis of the carriers and in the neighbourhood of meeting edges of such carriers when they are closed together, the said dowel pin being provided with a projection, the surface of which is at right angles to the axis of the said pin, and in which the carriers are provided in the neighbourhood of their meeting edges with inclined surfaces adapted as the carriers are closed together to take over the upper surface of the projection on the dowel pin and to wedge the halves of the neck mould against the under surface of the head for the purposes set forth.

7. In a machine for the manufacture of blown glass articles having a blowing head and a sectional neck mould, the halves of which are mounted in pivoted carriers so that they can be opened and closed together, the said machine also having a sectional blow mould the halves of which are adapted to be brought up to the neck mould; a construction in which the blowing head is furnished with a depending dowel pin located diametrically opposite the pivotal axis of the carriers and in the neighbourhood of the meeting edges of such carriers when they are closed together, the said dowel pin being adapted to serve for centering the halves of the blow mould when in the raised position and having a projecting flange located in the neighbourhood of the meeting edges of the carriers when closed, the said carriers being also provided with projections having inclined surfaces adapted to engage over the projecting flange on the dowel pin and to wedge the halves of the neck mould against the under surface of the head in the closed position.

8. In a machine for the manufacture of glass articles, the combination with a blowing head, of a neck mould comprising opposite sections pivoted to the head, a dowel pin supported by the head, and cooperating means between the mould sections and the dowel pin for supporting said sections when closed.

9. In a machine for the manufacture of glass articles, the combination with a blowing head, of a neck mould comprising opposite sections pivoted to the head, a dowel pin supported by the head at a point diametrically opposite said pivot, and cooperating means between the mold sections and the dowel pin for supporting said sections when closed.

10. In a machine for the manufacture of glass articles, the combination with a blowing head, of a neck mould comprising opposite sections pivoted to the head, the ends of the sections opposite the pivot being respectively formed with alined grooves, a dowel pin supported by the head at a point diametrically opposite said pivot, and a flange on the pin for interlocking engagement with the grooves of the sections to support said sections when the same are closed.

In witness whereof I affix my signature.

SYDNEY HUNT.